US012463222B2

United States Patent
Zhang et al.

(10) Patent No.: US 12,463,222 B2
(45) Date of Patent: Nov. 4, 2025

(54) SECONDARY BATTERY AND ELECTRODE PLATE

(71) Applicant: CONTEMPORARY AMPEREX TECHNOLOGY (HONG KONG) LIMITED, Hong Kong (CN)

(72) Inventors: Zige Zhang, Ningde (CN); Wei Li, Ningde (CN); Jing Li, Ningde (CN); Qingrui Xue, Ningde (CN); Miao Jiang, Ningde (CN); Yuqian Wen, Ningde (CN); Long Wang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 37 days.

(21) Appl. No.: 18/518,597

(22) Filed: Nov. 23, 2023

(65) Prior Publication Data
US 2024/0088395 A1    Mar. 14, 2024

Related U.S. Application Data

(62) Division of application No. 16/233,296, filed on Dec. 27, 2018, now abandoned.

(30) Foreign Application Priority Data

Jul. 13, 2018 (CN) .............................. 201810768859

(51) Int. Cl.
*H01M 4/64* (2006.01)
*H01M 4/66* (2006.01)
(Continued)

(52) U.S. Cl.
CPC ............. *H01M 4/64* (2013.01); *H01M 4/667* (2013.01); *H01M 4/668* (2013.01); *H01M 10/04* (2013.01);
(Continued)

(58) Field of Classification Search
CPC ............. H01M 50/533; H01M 50/531; H01M 50/536; H01M 50/50; H01M 50/54;
(Continued)

(56) References Cited

U.S. PATENT DOCUMENTS 6,849,358 B2   2/2005   O'Connell et al.
2005/0014036 A1   1/2005   Kim
(Continued)

FOREIGN PATENT DOCUMENTS

CN   101345322 A   1/2009
CN   101345322 B   1/2009
(Continued)

OTHER PUBLICATIONS

Asako WO 2012/118127 Machine Translation (Year: 2012).*
(Continued)

*Primary Examiner* — Ula C Ruddock
*Assistant Examiner* — Anna Korovina
(74) *Attorney, Agent, or Firm* — ANOVA LAW GROUP, PLLC

(57) ABSTRACT

An electrode plate includes an active material layer, a current collector including an insulating layer and first and second conductive layers sandwiching the insulating layer, and a conductive structure. The conductive structure includes a first conductive member including a first section arranged along a side of the first conductive layer and a second section extending from the first section and beyond the current collector in a direction away from the active material layer, and a second conductive member including a first connecting section connected to the second conductive layer, a bent section connected to the first connecting section and bent towards the first conductive member relative to the first connecting section, and a second connecting section
(Continued)

bent backward relative to the bent section to be sandwiched between the first section and the first conductive layer.

20 Claims, 7 Drawing Sheets

(51) Int. Cl.
  *H01M 10/04* (2006.01)
  *H01M 50/533* (2021.01)
  *H01M 4/02* (2006.01)
  *H01M 50/538* (2021.01)
(52) U.S. Cl.
  CPC .... *H01M 50/533* (2021.01); *H01M 2004/021* (2013.01); *H01M 50/538* (2021.01)
(58) Field of Classification Search
  CPC ............. H01M 50/534; H01M 50/502; H01M 50/514; H01M 50/516; H01M 50/528
  See application file for complete search history.

(56) References Cited

U.S. PATENT DOCUMENTS

| | | | |
|---|---|---|---|
| 2008/0254360 A1 | 10/2008 | Miyazawa et al. | |
| 2009/0017376 A1 | 1/2009 | Yamamura et al. | |
| 2009/0035657 A1* | 2/2009 | Buiel ..................... | H01G 11/46 429/211 |
| 2010/0055558 A1* | 3/2010 | Choi ................. | H01M 10/0525 429/185 |
| 2010/0178559 A1 | 7/2010 | Mao et al. | |
| 2011/0135999 A1 | 6/2011 | Kwak et al. | |
| 2012/0015240 A1 | 1/2012 | Baek | |
| 2016/0006013 A1 | 1/2016 | Shen et al. | |
| 2018/0198132 A1 | 7/2018 | Liang et al. | |
| 2019/0088925 A1* | 3/2019 | Harutyunyan ........ | H01M 4/362 |

FOREIGN PATENT DOCUMENTS

| | | | | |
|---|---|---|---|---|
| CN | 102842735 | A | 12/2012 | |
| CN | 102856558 | A | 1/2013 | |
| CN | 102856578 | A | 1/2013 | |
| CN | 107528041 | A | 12/2017 | |
| CN | 207542313 | U | 6/2018 | |
| DE | 112013004251 | T5 | 7/2015 | |
| EP | 2892103 | A1 | 7/2015 | |
| EP | 2939294 | A1 | 11/2015 | |
| JP | H10255754 | A | 9/1998 | |
| JP | 2006236960 | A | 9/2006 | |
| JP | 2008027892 | A | 2/2008 | |
| JP | 2009187675 | A | 8/2009 | |
| JP | 2014053230 | A | 3/2014 | |
| KR | 20130138371 | A | 12/2013 | |
| WO | 2012081368 | A1 | 6/2012 | |
| WO | 2012093588 | A1 | 7/2012 | |
| WO | WO-2012118127 | A1 * | 9/2012 | ............ H01M 2/266 |
| WO | 2014101479 | A1 | 7/2014 | |

OTHER PUBLICATIONS

Matsuyama JP 2009187675 Machine Translation (Year: 2009).*
The China National Intelleectual Property Administration (CNIPA) The Notice of Grant of Invention Patent Right for 201810768859.5 Dec. 31, 2019. 6 pages.(including translation).
The China National Intelleectual Property Administration (CNIPA) The First Office Action for Application. 201810768859.5 Sep. 3, 2019. 18 pages. (including translation).
The European Patent Office (EPO) Extended Search Report for EP Application No. 18248114.3 Jul. 10, 2019 8 Pages.
The China National Intelleectual Property Administration (CNIPA) The First Office Action for Application. 202010157355.7 Jan. 12, 2021 20 pages (including translation).
The European Patent Office (EPO) Decision To Grant a European Patent Pursuant To Article 97(1) EPC for 18248114.3 Jul. 1, 2021 1 Pages.
The China National Intelleectual Property Administration (CNIPA) Notice of Grant of Invention Patent Right for 202010157355.7 Dec. 15, 2021 2 Pages (including translation).
The China National Intelleectual Property Administration (CNIPA) the Second Office Action for 202010157355.7 6 Pages (including translation) Jul. 14, 2021.
The China National Intelleectual Property Administration (CNIPA) the China Search Report for 201810768859.5 2 Pages.
The China National Intelleectual Property Administration (CNIPA) the China Search Report for 202010157355.7 2 Pages.
The China National Intellectual Property Administration (CNIPA) the China Supplementary Search Report for 201810768859.5 2 Pages.
United States Patent and Trademark Office (USPTO) Requirement for Restriction for U.S. Appl. No. 16/233,296, filed Nov. 13, 2020 8 pages.
The European Patent Office (EPO) The Intention to grant EPC for Application 18248114.3 Apr. 1, 2021 5 Pages.
United States Patent and Trademark Office (USPTO) Non-Final Office Action for U.S. Appl. No. 16/233,296, filed Mar. 22, 2021 14 pages.
United States Patent and Trademark Office (USPTO) Final Office Action for U.S. Appl. No. 16/233,296, filed Jul. 14, 2021 17 pages.
United States Patent and Trademark Office (USPTO) Advisory Action for U.S. Appl. No. 16/233,296, filed Sep. 16, 2021 3 pages.
United States Patent and Trademark Office (USPTO) Non-Final Office Action for U.S. Appl. No. 16/233,296, filed Mar. 15, 2022 14 pages.
United States Patent and Trademark Office (USPTO) Final Office Action for U.S. Appl. No. 16/233,296, filed Aug. 24, 2022 24 pages.
United States Patent and Trademark Office (USPTO) Advisory Action for U.S. Appl. No. 16/233,296, filed Nov. 9, 2022 5 pages.
United States Patent and Trademark Office (USPTO) Non-Final Office Action for U.S. Appl. No. 16/233,296, filed Mar. 13, 2023 14 pages.
United States Patent and Trademark Office (USPTO) Final Office Action for U.S. Appl. No. 16/233,296, filed Aug. 25, 2023 17 pages.
United States Patent and Trademark Office (USPTO) Final Rejection for U.S. Appl. No. 18/518,604, filed Feb. 3, 2025 12 Pages.
United States Patent and Trademark Office (USPTO) Non-final Rejection for U.S. Appl. No. 18/518,604, filed Aug. 12, 2024 24 Pages.
United States Patent and Trademark Office (USPTO) Notice of Abandonment for U.S. Appl. No. 16/233,296, filed Apr. 18, 2024 2 Pages.
United States Patent and Trademark Office (USPTO) Advisory Action for U.S. Appl. No. 18/518,604, filed Mar. 20, 2025 3 Pages.

* cited by examiner

SECONDARY BATTERY AND ELECTRODE PLATE

CROSS REFERENCE TO RELATED APPLICATIONS

The present application is a division of application Ser. No. 16/233,296, filed on Dec. 27, 2018, which claims priority to Chinese Patent Application No. 201810768859.5 filed on Jul. 13, 2018 and entitled "SECONDARY BATTERY AND ELECTRODE PLATE THEREOF", the disclosures of which are incorporated herein by reference in their entirety.

TECHNICAL FIELD

The present disclosure relates to battery technologies, and more particularly to a secondary battery and an electrode plate.

BACKGROUND

A typical secondary battery includes an electrode plate and the electrode plate generally includes a current collector and an active material layer coated on a surface of the current collector. Further, the current collector includes a sandwich structure that has a conductive layer, an insulating layer and a conductive layer. To allow a current channel between the sandwich structure and an electrode terminal of the secondary battery, two additional metal sheets are arranged to connect to the sandwich structure.

SUMMARY

Some embodiments of the present disclosure provide a secondary battery and an electrode plate, which can reduce the space of a conductive structure and improve energy density of the secondary battery.

The electrode plate includes a current collector, an active material layer and a conductive structure. The current collector includes an insulating layer, a first conductive layer and a second conductive layer, and the first conductive layer and the second conductive layer are respectively arranged on two surfaces of the insulating layer. The first conductive layer has a first body section and a first protruding section arranged to connect to the first body section, and a surface of the first body section away from the insulating layer is covered by the active material layer, while a surface of the first protruding section that is away from the insulating layer is not covered by the active material layer. The second conductive layer has a second body section and a second protruding section arranged to connect to the second body section, and a surface of the second body section which is away from the insulating layer is covered by the active material layer, while a surface of the second protruding section that is away from the insulating layer is not covered by the active material layer.

The conductive structure includes a first conductive member arranged to connect to the first protruding section and a second conductive member arranged to connect to the second protruding section. The second conductive member is bent towards the first conductive member and connects to the first conductive member, and wherein the first conductive member extends away from the active material layer and is beyond the second conductive member.

In some embodiments, the second conductive member includes a first connecting section arranged to connect to the second protruding section, a bent section bent towards the first conductive member relatively to the first connecting section, and a second connecting section arranged to connect to the first conductive member. The bent section connects the first connecting section with the second connecting section.

In some embodiments, the bent section is located at a side of the second protruding section away from the active material layer.

In some embodiments, the second connecting section connects the first conductive member with the first protruding section, the second connecting section is bent towards the active material layer relatively to the bent portion.

In some embodiments, the conductive structure is integrally formed, and an end of the first conductive member that is closer to the active material layer connects to an end of the second connecting section, the end of the second connecting section is closer to the active material layer.

In some embodiments, a fusion region is formed to connect the first conductive member, the second connecting section and the first protruding section.

In some embodiments, the first conductive member connects to a section of the first protruding section, the section being located between the second connecting section and the active material layer.

In some embodiments, the second connecting section connects to an end of the bent section that is closer to the first conductive member and extends away from the current collector.

In some embodiments, the first conductive layer has a thickness of 0.7~0.9 um.

In some embodiments, the second conductive layer has a thickness of 0.7~0.9 um.

The secondary battery has an electrode assembly including the electrode plate described above.

In some embodiments, the first protruding section, the second protruding section and a section of the insulating layer located between the first protruding section and the second protruding section form an electric guiding section. The electrode assembly has at least two electric guiding sections and at least two conductive structures, and the at least two electrical guiding sections are laminated. The section of the first conductive member beyond the second conductive member is a current collecting section, and a current collecting section of one conductive structure contacts a current collecting section of an adjacent conductive structure.

In some embodiments, the secondary battery includes an electrode terminal and an adapter sheet arranged to connect to the electrode terminal, each current collecting section of the at least two conductive structures connects to the adapter sheet, and each second conductive member of the at least two conductive structures is located on a side of the current collecting section that is away from the adapter sheet.

Figure 1:
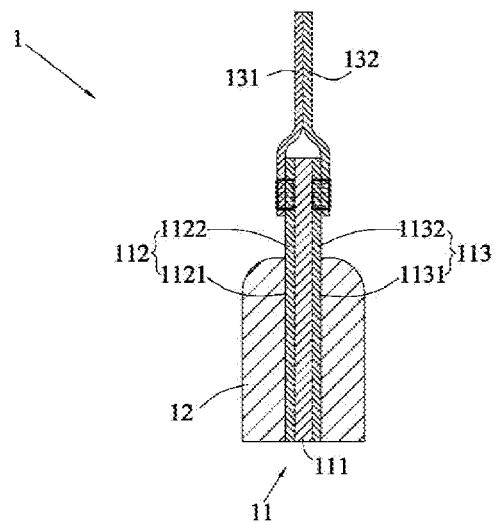
FIG. 1 is a schematic view of an exemplary electrode plate in the existing technologies.

Reference signs are listed as follows.
1 electrode plate
11 current collector
111 insulating layer
112 first conductive layer
1121 first body section
1122 first protruding section
113 second conductive layer
1131 second body section
1132 second protruding section
12 active material layer
13 conductive structure
131 first conductive member
132 second conductive member
1321 first connecting section
1322 bent section
1323 second connecting section
1A positive electrode plate
1B negative electrode plate
2 case
3 top cap
4 electrode terminal
5 separator
6 adapter sheet
C current collecting section
P electric guiding section
W1 first fusion region
W2 second fusion region
X length direction
Y thickness direction
Z height direction

DETAILED DESCRIPTION

The following detailed description is merely exemplary in nature and is not intended to limit the application and uses. Furthermore, there is no intention to be bound by any theory presented in the preceding background or summary or the following detailed description.

In the description of the present disclosure, it should be understood that the singular forms, "a," "an," and "the" are intended to include the plural forms as well, unless context clearly indicates otherwise.

Figure 2:
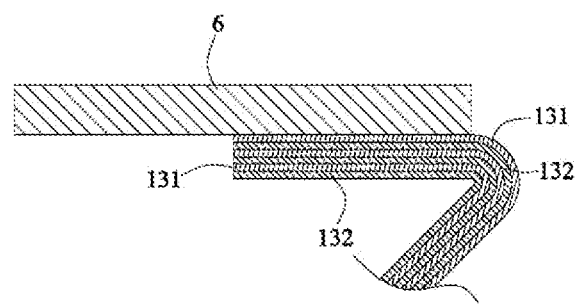
FIG. 2 is a schematic view showing a connection between an exemplary electrode plate and an exemplary adapter sheet in the existing technologies.

FIG. 1 shows an exemplary electrode plate in the existing technologies. In order to improve safety performance of the secondary battery, a current collector 11 of a multilayer structure is selected for some electrode plates 1. With reference to FIG. 1, the current collector 11 includes an insulating layer 111, a first conductive layer 112 and a second conductive layer 113, where the first layer 112 and the second conductive layer 113 are respectively provided to two surfaces of the insulating layer 111. The first conductive layer 112 includes a first body section 1121 covered by an active material layer 12 and a first protruding section 1122 protruding to an outside of the active material layer 12. The second conductive layer 113 includes a second body section 1131 covered by the active material layer 12 and a second protruding section 1132 protruding to an outside of the active material layer 12. The first protruding section 1122, the second protruding section 1132, and a section of the insulating layer 111 between the first protruding section 1122 and the second protruding section 1132 form an electric guiding section P. Since the first conductive layer 112 and the second conductive layer 113 are separated by the insulating layer 111, current cannot be transmitted between the first conductive layer 112 and the second conductive layer 113, resulting in poor current passing capacity of the electric guiding section P. In order to improve the current passing capacity thereof, a first conductive member 131 is usually soldered onto the first conductive layer 112, a second conductive member 132 is usually soldered onto the second conductive layer 113, and the first conductive member 131 and the second conductive member 132 are both soldered to an adapter sheet 6 fixed to an electrode terminal. Thereby, currents in the first conductive layer 112 and second conductive layer 113 are collected to the electrode terminal. In the secondary battery, in order to improve the current passing capacity, there are generally a plurality of the electric guiding sections P that are laminated, on each of which the first conductive member 131 and the second conductive member 132 are required to be soldered. With reference to FIG. 2, both the first conductive member 131 and the second conductive member 132 need to be laminated together and soldered to the adapter sheet 6. This, however, will cause the first conductive member 131 and the second conductive member 132 to take a large amount of space, resulting in a reduced energy density for the secondary battery.

A secondary battery and an electrode thereof according to some embodiments of the present disclosure will be described in details below with reference to the drawings.

Figure 3:
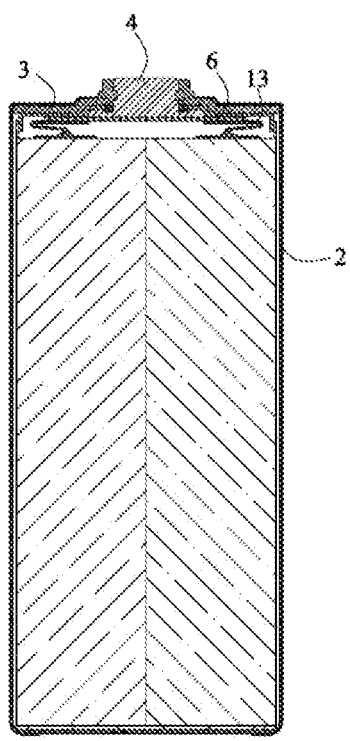
FIG. 3 is a schematic view of an exemplary secondary battery according to some embodiments of the present disclosure.

With reference to FIG. 3, the secondary battery includes an electrode assembly, a case 2, a top cap 3, an electrode terminal 4 and an adapter sheet 6.

Figure 4:
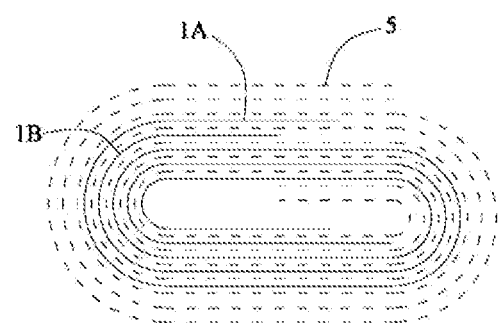
FIG. 4 is a schematic view of an electrode assembly for an exemplary secondary battery according to some embodiments of the present disclosure.
Figure 5:
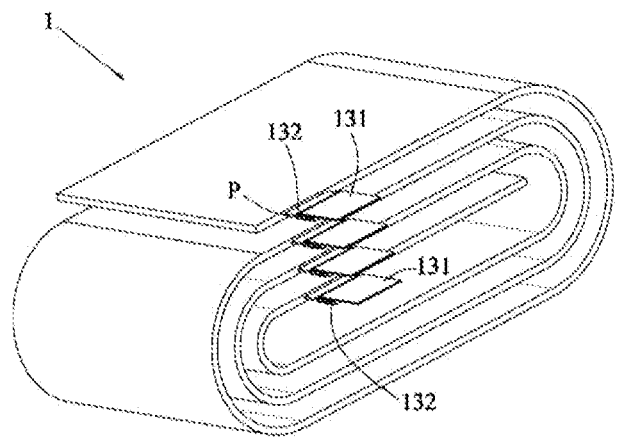
FIG. 5 is a schematic view of an exemplary electrode plate according to some embodiments of the present disclosure.
Figure 6:
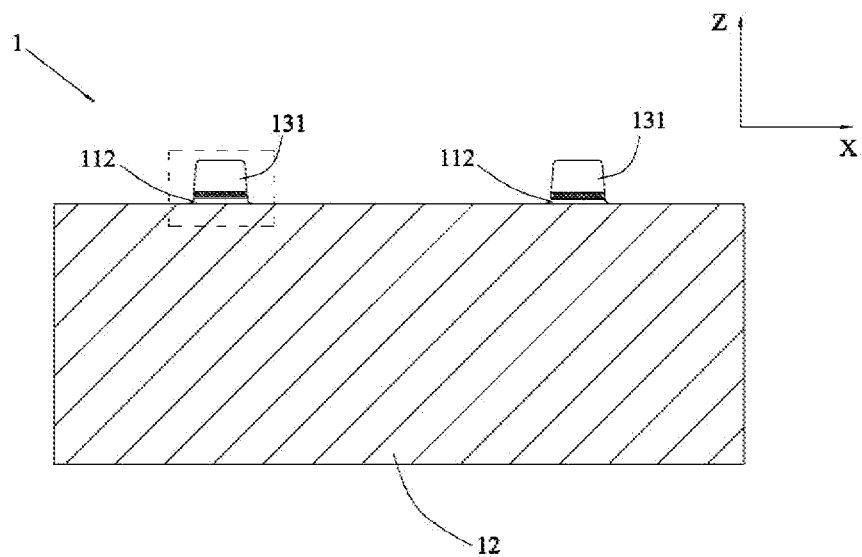
FIG. 6 is another schematic view of an exemplary electrode plate according to some embodiments of the present disclosure.
Figure 7:
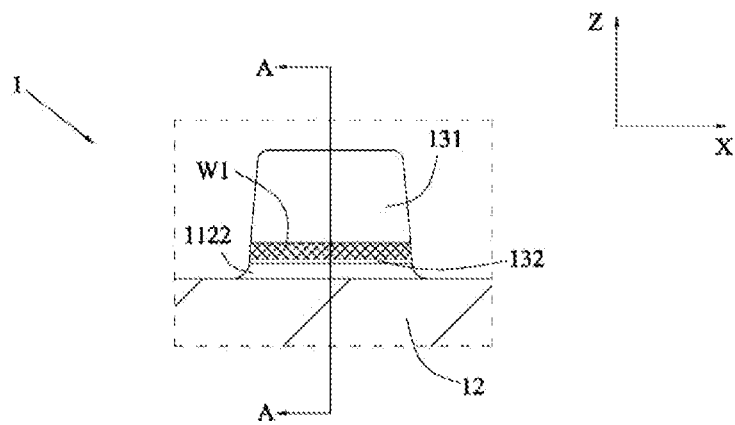
FIG. 7 is an enlarged view of the dotted line part of FIG. 6.

With reference to FIG. 4, the electrode assembly includes a positive electrode plate 1A, a negative electrode plate 1B and a separator 5 arranged between the positive electrode plate 1A and the negative electrode plate 1B. In one embodiment, the positive electrode plate 1A, the separator 5, and the negative electrode plate 1B are sequentially laminated and wound to form a jelly roll-shaped electrode assembly. In another embodiment, the positive electrode plate 1A, the separator 5, and the negative electrode plate 1B may also be sequentially laminated to form a laminated electrode assembly.

The case 2 may be of a hexahedron shape or another shape. An accommodating cavity is formed inside the case 2 to accommodate the electrode assembly and electrolyte. An opening is formed at one end of the case 2, through which the electrode assembly may be placed in the accommodating cavity of the case 2. The case 2 may be made of either such conductive metals as aluminum or aluminum alloy or such insulating materials as plastic.

The top cap 3 is arranged at the case 2, covering the opening of the case 2, so that the electrode assembly is sealed inside the case 2. The electrode terminal 4 is arranged at the top cap 3, and an upper end of the electrode terminal 4 protrudes upwards from the top cap 3, while a lower end of the electrode terminal 4 may pass through the top cap 3 and extend into the case 2. The adapter sheet 6 is arranged inside the case 2, fixed to the electrode terminal 4. There are two electrode terminals 4 and two adapter sheets 6, and the positive electrode plate 1A connects to one electrode terminal 4 via one adapter sheet 6, while the negative electrode plate 1B connects to the other electrode terminal 4 via the other adapter 6.

In the secondary battery, at least one of the positive electrode plate 1A and the negative electrode plate 1B uses an electrode plate 1 described below.

With reference to FIGS. 5 to 8, the electrode plate 1 includes a current collector 11, an active material layer 12 and a conductive structure 13. The current collector 11 includes an insulating layer 111, a first conductive layer 112 and a second conductive layer 113. The first conductive 112 and the second conductive layer 113 are respectively arranged on two surfaces of the insulating layer 111. The first conductive layer 112 has a first body section 1121 and a first protruding section 1122 connected to the first body portion 1121. The surface of the first body section 1121 away from the insulating layer 111 is covered by the active material layer 12, while the surface of the first protruding section 1122 away from the insulating layer 111 is not covered by the active material layer 12. The second conductive layer 113 has a second body section 1131 and a second protruding section 1132 connected to the second body section 1131. The surface of the second body section 1131 away from the insulating layer 111 is covered by the active material layer 12, while the surface of the second protruding section 1132 away from the insulating layer 111 is not covered by the active material layer 12.

A conductive structure 13 includes a first conductive member 131 connected to the first protruding section 1122 and a second conductive member 132 connected to the second protruding section 1132. The second conductive member 132 is bent towards and connected to the first conductive member 131. The second conductive member 132 may either directly connect the first conductive member 131, or indirectly connect the first conductive member 131 via the first protruding section 1122. The first conductive member 131 extends away from the active material layer 12 beyond the second conductive member 132. In other words, with reference to FIG. 8, a part of the first conductive member 131 extends beyond the second conductive member 132 in the direction away from the active material layer 12, the part of the first conductive member 131 beyond the second conductive member 132 is defined as a current collecting section C.

Figure 9:
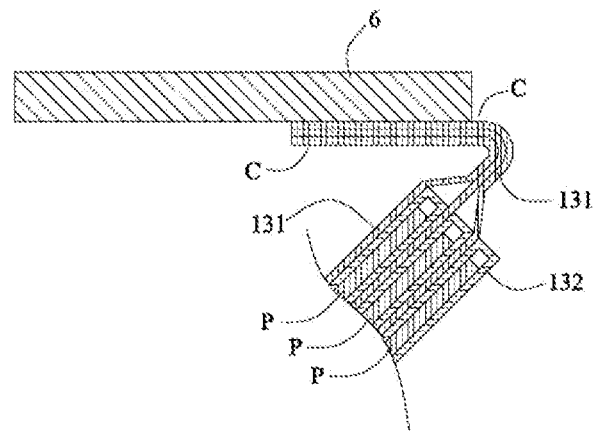
FIG. 9 is a schematic view showing a connection between the exemplary electrode plate and the exemplary adapter sheet in FIG. 8.

With reference to FIG. 9, the first protruding section 1122, the second protruding section 1132, and a section of the insulating layer 111 between the first protruding section 1122 and the second protruding section 1132 form an electric guiding section P. In the secondary battery, the electrode assembly has a plurality of electric guiding sections P and a plurality of conductive structures 13, the plurality of electric guiding sections P is arranged to be laminated. The current collecting section C of one conductive structure 13 contacts with the current collecting section C of another conductive structure 13.

With reference to FIG. 9, each current collecting section C of the plurality of conductive structures 13 is connected to the adapter sheet 6, and each second conductive member 132 of the plurality of conductive structures 13 is located at a side of the current collecting section C away from the adapter sheet 6. In a forming process of the secondary battery, the current collecting section C of the plurality of conductive structures 13 may be soldered to the adapter sheet 6 in the first place. Then with reference to FIGS. 3 and 9, the second conductive member 132 is flipped to the lower side of the adapter sheet 6 via the bent current collecting section C.

In the secondary battery, since the current collector 11 of the electrode plate 1 is provided with the insulating layer 111, the thicknesses of the first conductive layer 112 and second conductive layer 113 can be reduced. In some embodiments, the first and/or conductive layer has a thickness of 0.1~10 um, for example, 0.1 um, 1 um, 2 um, 3 um, 4 um, 5 um, 6 um, 7 um, 8 um, 9 um, 10 um. In some embodiments, the first and/or conductive layer has a thickness of 0.7~0.9 um, for example, 0.7 um, 0.8 um, 0.9 um. When an external object pierces the electrode plate 1, due to small thicknesses of the first conductive layer 112 and second conductive layer 113, the first conductive layer 112 and the second conductive layer 113 have small burrs generated at the portion pierced by the external object. It is therefore difficult to pierce the separator 5, and consequently short circuit is avoided and safety performance is improved. The first conductive member 131 and the second conductive member 132 may collect current in the first conductive layer 112 and the second conductive layer 113 to the adapter sheet 6, thereby improving current passing capacity.

With reference to FIG. 9, in the secondary battery of the present application, the current in the first conductive layer 112 and the second conductive layer 113 may be collected to the adapter sheet 6 by simply connecting the current collecting section C of the first conductive member 131 to the adapter sheet 6 without the need for the second conductive member 132 to be connected to the adapter sheet 6. Therefore, the present application may reduce the overall thickness after the adapter sheet 6 and the conductive structure 13 are connected together and the space taken by the conductive structure 13, and improves energy density of the secondary battery, as compared with existing technologies.

Figure 8:
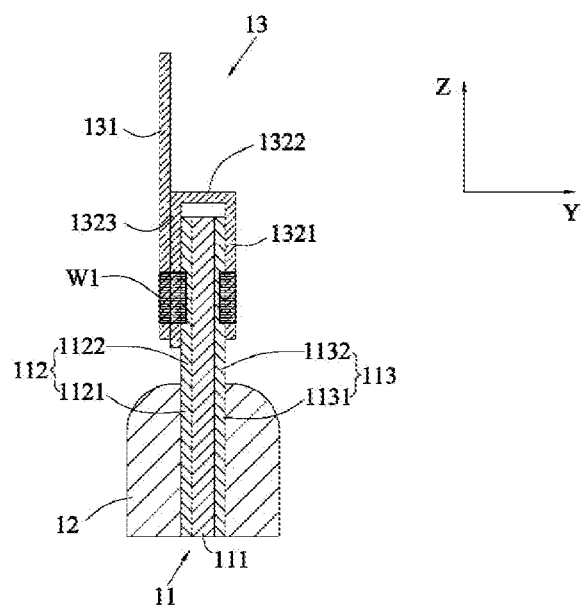
FIG. 8 is a sectional view along the A-A line.

With reference to FIG. 8, the second conductive member 132 includes a first connecting section 1321 connected to the second protruding section 1132, second connecting section 1323 connected to the first conductive member 131, and a bent section 1322 bent towards the first conductive member 131 relatively to the first connecting section 1321. The bent section 1322 is connected between the first connecting section 1321 and the second connecting section 1323. By bending the second conductive member 132, the second conductive member 132 may be connected to the first conductive member 131, and the space taken by the second conductive member 132 in the height direction Z may also be reduced, so as to ensure that the current collecting section C is reserved for the first conductive member 131.

As two examples, the electrode plate 1 can be formed differently, as explained below.

In one example, two metal foils are soldered to the first conductive layer 112 and the second conductive layer 113. Then, the two metal foils are bent and connected. Finally, the first protruding section 1122, the second protruding section 1132, the first conductive member 131 and the second conductive member 132 of desired shapes are formed by cutting the first conductive layer 112, the second conductive layer 113 and the two metal foils. At this time, the bent portion 1322 is preferably located on the side of the second protruding section 1132 away from the active material layer 12, so that the bending of the second conductive member 132 may be completed before the cutting process. The forming method may simultaneously form at least two first conductive members 131 and second conductive members 132 to facilitate continuous production.

In another example, the first conductive layer 112 and the second conductive layer 113 are firstly cut to form a first protruding section 1122 and a second protruding section 1132 of desired shapes. Then, the cut first conductive member 131 and the cut second conductive member 132 are respectively soldered to the first protruding section 1122 and the second protruding section 1132. Finally, the second conductive member 132 is folded and connected to the first conductive member 131. When this forming method is adopted, the bent section 1322 may be located on the side of the electric guiding section P in the length direction X. At this time, the end of the electric guiding section P away from the active material layer 12 may extend beyond the end of the second conductive member 132 away from the active material layer 12. The second conductive member 132 does not take additional space in the height direction Z.

Some examples the electrode plate 1 of the present disclosure will now be described below.

FIG. 8 shows a first exemplary electrode plate according to some embodiments of the present disclosure. With reference to FIG. 8, the second connecting section 1323 is bent towards the active material layer 12 relatively to the bent section 1322, and the second connecting section 1323 is connected between the first conductive member 131 and the first protruding section 1122. At this time, the second connecting section 1323 is located on the side of the bent section 1322 closer to the active material layer 12, and the section of the first conductive member 131 beyond the bent section 1322 is the current collecting section C. Accordingly, the length of the current collecting section C may be increased relatively.

The first conductive member 131, the second connecting section 1323, and the first protruding section 1122 may be integrally soldered together, therefore a first fusion region W1 is formed. Insulating cement may be disposed on the surface of the first fusion region W1 and the surface of the first fusion region W1 is away from the insulating layer 111. The first connecting section 1321 may also be fixed to the second protruding section 1132 by soldering. It can be understood by the skilled person that in one example after the soldering, particles of the soldering materials may be formed onto the surface of the first fusion region W1 which is away from the insulating layer 111. Due to the insulating cement, the particles can be fixed in the insulating cement, and thus the particles are prevented from moving onto other parts of the electrode plate. Therefore, undesired short circuit caused by the particles can be effectively avoided.

Figure 10:
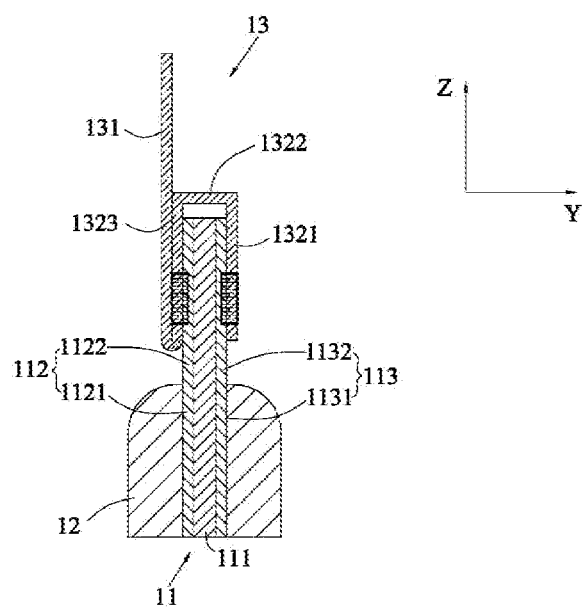
FIGS. 10 to 13 are schematic views of exemplary electrode plates according to some embodiments of the present disclosure.

FIG. 10 shows a second exemplary electrode plate according to some embodiments of the present disclosure. With reference to FIG. 10, the second connecting section 1323 is bent towards the active material layer 12 relatively to the bent section 1322, and the second connecting section 1323 is connected between the first conductive member 131 and the first protruding section 1122. The conductive structure 13 is an integrally formed piece, and an end of the first conductive member 131 closer to the active material layer 12 is connected to an end of the second connecting section 1323 that is closer to the active material layer 12. In this example, due to the integral form the strength of the conductive structure 13 can be improved and it is easier to manufacture and assemble the electrode plate.

The conductive structure 13 may be assembled according to the following steps. First, the conductive structure 13 is soldered to the second protruding section 1132. Then the section of the conductive structure 13 beyond the electric guiding section P is bent onto the first protruding section 1122, and the conductive structure 13 is soldered to the first protruding section 1122. Finally, the conductive structure 13 is bent again to form the first conductive member 131.

Figure 11:
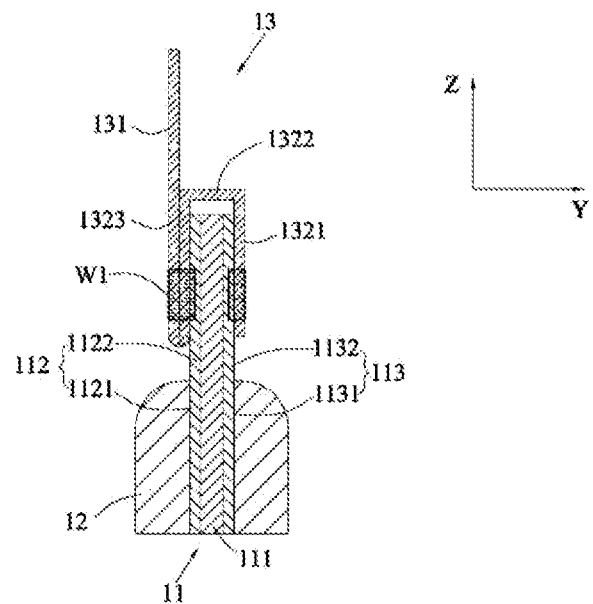

FIG. 11 shows a third exemplary electrode plate according to some embodiments of the present disclosure. With reference to FIG. 11, the second connecting section 1323 is bent towards the active material layer 12 relatively to the bent section 1322, and the second connecting portion 1323 is connected between the first conductive member 131 and the first protruding section 1122. The conductive structure 13 is integrally formed, and an end of the first conductive member 131 closer to the active material layer 12 is connected to an end of the second connecting portion 1323 closer to the active material layer 12. The first conductive member 131, the second connecting portion 1323, and the first protruding section 1122 are integrally soldered together, and the first fusion region W1 can be formed. Compared with the second exemplary electrode plate, the third exemplary electrode plate can increase the current passing area between the first conductive member 131 and the second connecting section 1323.

Figure 12:
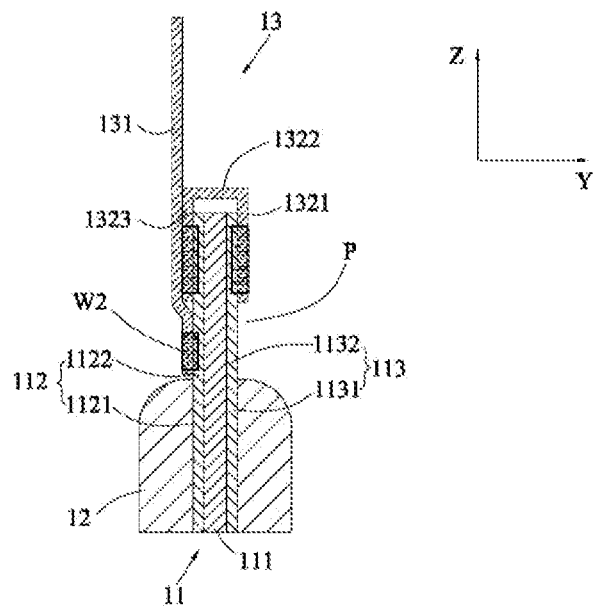

FIG. 12 shows a fourth exemplary electrode plate according to some embodiments of the present disclosure. With reference to FIG. 12, the second connecting section 1323 is bent towards the active material layer 12 relatively to the bent section 1322, and the second connecting portion 1323 is connected between the first conductive member 131 and the first protruding section 1122. The first conductive member 131 is connected to a section of the first protruding section 1122 between the second connecting section 1323 and the active material layer 12, and the first conductive member 131 is indirectly connected to the second connecting section 1323 via the first protruding section 1122. The first conductive member 131 is soldered to the first protruding section 1122 and forms a second fusion region W2, and the second connecting section 1323 is located on a side of the second fusion region W2 away from the active material layer 12. In one example, an effect of the exemplary electrode plate is to further increase the current passing area between the first conductive member 131 and the second connecting section 1323. This is due to the presence of the second fusion region W2 and the close contact between first conductive member 131 and the second connecting section 1323.

Figure 13:
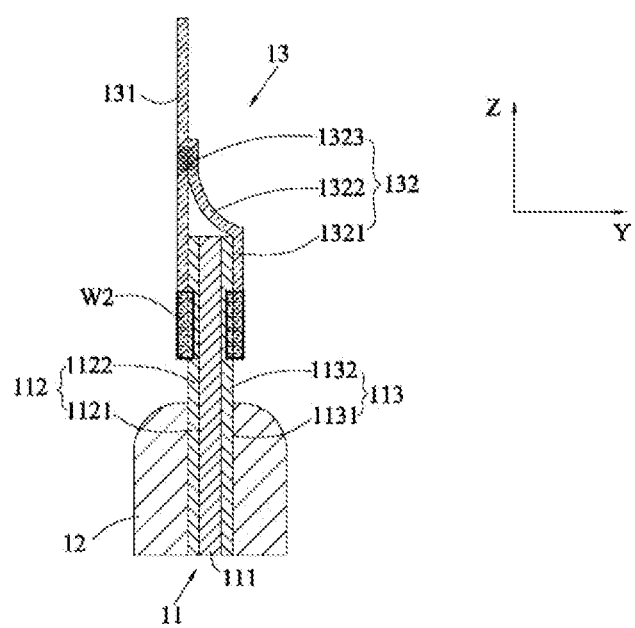

FIG. 13 shows a fifth exemplary electrode plate according to some embodiments of the present disclosure. With reference to FIG. 13, the second connecting section 1323 is connected to an end of the bent section 1322 that is closer to the first conductive member 131, and extends away from the current collector 11. During assembling, the first conductive member 131 and the second conductive member 132 are firstly soldered to the first protruding region 1122 and the second protruding region 1132, respectively. Then, the section of the second conductive member 132 beyond the electric guiding section P is bent onto the first conductive member 131. Finally, the first conductive member 131 and the second conductive member 132 are soldered together. In this example, the manufacturing process of bending the second conductive member 132 is simple.

Advantageous effects of the present disclosure lie in the following. In the secondary battery of the present application, the current in the first conductive layer and the second conductive layer may be collected to the adapter sheet simply by connecting the current collector of the first conductive member to the adapter sheet without connecting the second conductive member to the adapter sheet. Therefore, compared with the existing technologies, the present application may reduce an overall thickness after the adapter sheet and conductive structure are connected together, so that the space taken by a conductive structure is reduced and the energy density of the secondary battery is improved.

While specific embodiments of the invention have been described above, it will be appreciated that the invention may be practiced otherwise than as described. The descriptions above are intended to be illustrative, not limiting. Thus, it will be apparent to one skilled in the art that modifications may be made to the invention as described without departing from the scope of the claims set out below.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. An electrode plate for a secondary battery, comprising:
   an active material layer including a first active material sub-layer and a second active material sub-layer;
   a current collector partially sandwiched between the first active material sub-layer and the second active material sub-layer, the current collector comprising:
      an insulating layer;
      a first conductive layer between the first active material sub-layer and the insulating layer; and
      a second conductive layer between the insulating layer and the second active material sub-layer; and
   a conductive structure comprising:
      a first conductive member comprising:
         a first section arranged along a side of the first conductive layer; and
         a second section extending from the first section and beyond the current collector in a direction away from the active material layer; and
      a second conductive member comprising:
         a first connecting section connected to the second conductive layer;
         a bent section connected to the first connecting section and bent towards the first conductive member relative to the first connecting section; and
         a second connecting section bent backward relative to the bent section to be sandwiched between the first section of the first conductive member and the first conductive layer;
   wherein:
      a sum of a thickness of the first section of the first conductive member and a thickness of the second connecting section of the second conductive member is smaller than a thickness of the first active material sub-layer; and
      both the first section of the first conductive member and the second connecting section of the second conductive member do not touch the active material layer.

2. The electrode plate according to claim 1, wherein the first connecting section of the second conductive member is soldered to the second conductive layer, and the second connecting section of the second conductive member is soldered to the first conductive layer.

3. The electrode plate according to claim 1, wherein the first section of the first conductive member is separated from the first conductive layer by the second connecting section of the second conductive member.

4. The electrode plate according to claim 3, wherein the first section of the first conductive member is soldered to the second connecting section of the second conductive member, and the second connecting section of the second conductive member is soldered to the first conductive layer.

5. The electrode plate according to claim 1, wherein the conductive structure is integrally formed and is bent several times to form the first conductive member, the second connecting section, the bent section, and the first connecting section that are connected in this order, and an end of the first section of the first conductive member that is closer to the active material layer connects to an end of the second connecting section that is closer to the active material layer.

6. The electrode plate according to claim 5, wherein the second connecting section is soldered to the first conductive layer, and the first section of the first conductive member is not soldered to the second connecting section.

7. The electrode plate according to claim 5, wherein the second connecting section is soldered to the first conductive layer, and the first section of the first conductive member is soldered to the second connecting section.

8. The electrode plate according to claim 1, wherein a portion of the first section of the first conductive member is in direct contact with a section of the first conductive layer that is located between the second connecting section and the active material layer.

9. The electrode plate according to claim 8, wherein the portion of the first section of the first conductive member is soldered to the section of the first conductive layer.

10. The electrode plate according to claim 1, wherein:
   the first conductive layer, the insulating layer, and the second conductive layer are stacked along a stacking direction;
   a portion of the current collector protrudes beyond the active material layer in a protruding direction pointing away from the active material layer to form an electric guiding section; and
   the bent section is located on a side of the electric guiding section that is parallel to both the stacking direction and the protruding direction.

11. The electrode plate according to claim 10, wherein an end of the electric guiding section that faces away from the active material layer in the protruding direction is further away from the active material layer than an end of the second conductive member that faces away from the active material layer in the protruding direction.

12. The electrode plate according to claim 1, wherein the first conductive layer comprises:
 a first body section, wherein a surface of the first body section that is away from the insulating layer is covered by the active material layer; and
 a first protruding section connected to the first body section, wherein a surface of the first protruding section that is away from the insulating layer is not covered by the active material layer.

13. The electrode plate according to claim 12, wherein the first section of the first conductive member is arranged along a side of the first protruding section of the first conductive layer.

14. The electrode plate according to claim 13, wherein the second conductive layer comprises:
 a second body section, wherein a surface of the second body section that is away from the insulating layer is covered by the active material layer; and
 a second protruding section connected to the second body section, wherein a surface of the second protruding section that is away from the insulating layer is not covered by the active material layer.

15. The electrode plate according to claim 14, wherein the first connecting section of the second conductive member is connected to the second protruding section of the second conductive layer.

16. The electrode plate according to claim 15, wherein the bent section is located at a side of the second protruding section that is away from the active material layer.

17. The electrode plate according to claim 1, wherein at least one of the first conductive layer or the second conductive layer has a thickness of 0.7 µm~0.9 µm.

18. A secondary battery comprising:
 an electrode assembly that comprises the electrode plate according to claim 1.

19. The electrode plate according to claim 4, wherein:
 a fusion region is formed through the first section of the first conductive member, the second connecting section of the second conductive member, and the first conductive layer; and
 an insulating cement is provided at a surface of the fusion region that is away from the insulating layer.

20. The electrode plate according to claim 1, wherein the second connecting section of the second conductive member is closer to the active material layer than the first section of the first conductive member.

* * * * *